(12) United States Patent
Nair (10) Patent No.: US 10,917,304 B2
(45) Date of Patent: Feb. 9, 2021

(54) TASK MONITORING SYSTEM

(71) Applicant: PayPal, Inc., San Jose, CA (US)

(72) Inventor: Rahul Nair, Austin, TX (US)

(73) Assignee: PayPal, Inc., San Jose, CA (US)

( * ) Notice: Subject to any disclaimer, the term of this patent is extended or adjusted under 35 U.S.C. 154(b) by 527 days.

(21) Appl. No.: 14/985,331

(22) Filed: Dec. 30, 2015

(65) Prior Publication Data
US 2017/0195182 A1 Jul. 6, 2017

(51) Int. Cl.
*H04L 12/24* (2006.01)
*G06Q 10/06* (2012.01)
*H04W 4/80* (2018.01)

(52) U.S. Cl.
CPC ...... *H04L 41/12* (2013.01); *G06Q 10/063114* (2013.01); *H04L 41/0816* (2013.01); *H04W 4/80* (2018.02)

(58) Field of Classification Search
USPC ........................................ 709/207, 224, 232
See application file for complete search history.

(56) References Cited

U.S. PATENT DOCUMENTS

| | | | | |
|---|---|---|---|---|
| 8,438,066 B1* | 5/2013 | Yuen | ................ | G06Q 20/206 705/16 |
| 9,020,848 B1* | 4/2015 | Ridge | ................ | G06Q 40/125 705/32 |
| 9,373,108 B2* | 6/2016 | Sathe | ................ | G06Q 20/10 |
| 10,026,073 B2* | 7/2018 | Moshfeghi | ......... | G06Q 30/0261 |
| 10,402,812 B2* | 9/2019 | Hudson | .............. | G06Q 20/3224 |
| 10,460,305 B1* | 10/2019 | Fine | ........................ | G06Q 20/22 |
| 2002/0087684 A1* | 7/2002 | Foth | ........................ | H04L 29/06 709/225 |
| 2003/0014383 A1* | 1/2003 | Cho | ........................ | G06F 16/313 |
| 2003/0053447 A1* | 3/2003 | Thompson | .............. | H04L 29/06 370/352 |
| 2003/0074516 A1* | 4/2003 | Cho | ........................ | G06F 16/367 711/1 |
| 2004/0199402 A1* | 10/2004 | Walker | ................... | G06Q 30/02 705/313 |
| 2006/0074813 A1* | 4/2006 | Saunders | ............... | G06Q 20/20 705/67 |
| 2006/0129416 A1* | 6/2006 | Shum | ................... | G06Q 30/0603 705/500 |
| 2007/0008179 A1* | 1/2007 | Hedley | ................... | G07B 15/06 340/928 |
| 2007/0176771 A1* | 8/2007 | Doyle | ................. | G08B 13/1427 340/539.13 |
| 2008/0147491 A1* | 6/2008 | Robinson | ............... | G06Q 10/02 705/13 |
| 2008/0186165 A1* | 8/2008 | Bertagna | ............ | G08B 21/0227 340/539.13 |
| 2009/0248553 A1* | 10/2009 | Taylor | .................... | G06Q 10/10 705/32 |
| 2010/0088149 A1* | 4/2010 | Sullivan | ................. | G06Q 20/20 705/14.65 |
| 2010/0121758 A1* | 5/2010 | Weiss | ..................... | G06Q 20/10 705/37 |
| 2011/0148634 A1* | 6/2011 | Putz | ........................ | G08B 21/22 340/541 |

(Continued)

*Primary Examiner* — David P Zarka
(74) *Attorney, Agent, or Firm* — Haynes and Boone, LLP (57) ABSTRACT

A system and method for task monitoring that communicates with a device to determine the occurrence of a parameter and changing a rate of transfer based on the occurrence of the parameter.

20 Claims, 4 Drawing Sheets

(56) References Cited

U.S. PATENT DOCUMENTS

| | | | | |
|---|---|---|---|---|
| 2012/0203610 A1* | 8/2012 | Grigg | G06Q 30/06 | 705/14.23 |
| 2012/0215594 A1* | 8/2012 | Gravelle | G07B 15/02 | 705/13 |
| 2012/0246018 A1* | 9/2012 | Sathe | G06Q 20/10 | 705/16 |
| 2012/0246074 A1* | 9/2012 | Annamalai | G01S 1/68 | 705/44 |
| 2013/0006718 A1* | 1/2013 | Nielsen | G06Q 10/06312 | 705/7.42 |
| 2013/0006724 A1* | 1/2013 | Simanek | G06Q 30/0207 | 705/13 |
| 2013/0110285 A1* | 5/2013 | Kadaba | E01H 10/007 | 700/240 |
| 2013/0295970 A1* | 11/2013 | Sheshadri | G01S 19/34 | 455/456.6 |
| 2013/0326137 A1* | 12/2013 | Bilange | G06F 12/0866 | 711/113 |
| 2014/0035726 A1* | 2/2014 | Schoner | H04W 4/029 | 340/8.1 |
| 2014/0279713 A1* | 9/2014 | Calman | G06Q 20/3224 | 705/418 |
| 2014/0337867 A1* | 11/2014 | Wilson | G01S 19/14 | 725/9 |
| 2014/0351411 A1* | 11/2014 | Woods | H04W 4/021 | 709/224 |
| 2015/0088618 A1* | 3/2015 | Basir | G07B 15/063 | 705/13 |
| 2015/0149357 A1* | 5/2015 | Ioannidis | G06Q 20/3224 | 705/44 |
| 2015/0206087 A1* | 7/2015 | Tavares | G06Q 10/06393 | 705/7.34 |
| 2015/0317842 A1* | 11/2015 | Evans | G06Q 20/325 | 705/13 |
| 2015/0348146 A1* | 12/2015 | Shanmugam | G06Q 20/3829 | 705/71 |
| 2016/0098864 A1* | 4/2016 | Nawrocki | H04B 5/0025 | 705/13 |
| 2016/0125662 A1* | 5/2016 | Fujita | G07B 15/02 | 705/13 |
| 2016/0171541 A1* | 6/2016 | Brockman | G06Q 30/0255 | 705/14.53 |
| 2016/0203651 A1* | 7/2016 | Heath | G06Q 50/30 | 705/13 |
| 2017/0178117 A1* | 6/2017 | McClard | G06Q 20/223 | |
| 2018/0227700 A1* | 8/2018 | Baca | H04W 4/029 | |

\* cited by examiner

TASK MONITORING SYSTEM

TECHNICAL FIELD

The present disclosure generally relates to task monitoring and more specifically monitoring tasks based on data from user devices.

BACKGROUND

Current methods of assigning and monitoring tasks are antiquated. Generally a goal of a task is communicated to a performer and then the performer will perform the task. There is very little in terms of being able to monitor and adjust task parameters on the fly. It would be desirable if one were able to monitor a task and change parameters for the task as the task changed. For example, a simple task may suddenly become complicated or difficult, but notification of such a change may be time consuming. Thus, a system that monitors a task for changes and provides quick notification of such changes would be beneficial.

Furthermore, monitoring employees, contractors, and/or other personnel is difficult. Most methods of monitoring require someone to watch the personnel constantly. This is often very difficult, especially when tasks are being completed at odd hours and/or at different times of the day. It can be expensive to have someone monitor every minute of a task. Thus, a system that would help monitor a task at all hours would be beneficial. It would be desirable if such a system could monitor the progress of the execution of the task in small time increments such as hours, minutes, seconds, or smaller.

Furthermore, in many situations there can be several tasks being handled by multiple personnel. It may be beneficial to be able to regularly monitor each of the personnel for efficiency, work quality, and/or the like. However it is prohibitively expensive to dedicate someone to watching each one of the personnel and tasks to completion. Instead, the more practical solution would be to have one or more people watch several personnel.

However, having someone monitor multiple tasks that are occurring at the same time splits their attention. People are only able to focus on one thing at any given time and will often miss an incident when their attention is somewhere else. Furthermore people are fallible and corruptible such that extensive background checks may be necessary before hiring people to monitor tasks that are sensitive in nature. Thus, it would be beneficial if a system that could more accurately monitor multiple tasks by multiple personnel existed.

It would also be beneficial if the system were able to monitor and integrate with existing personal devices of personnel for information regarding the performance of a task. For example, a system capable of integrating and collecting data from everyday smart objects such as smart phones, smart watches, fitness bands, and/or the like would reduce the need for special hardware.

A system that could leverage data from multiple objects, some which may be owned by the personnel while others may be owned by the employer, for increasing the accuracy of the task monitoring would also be beneficial.

Furthermore, it would be desirable if such a system were customizable such that the parameters and the devices for monitoring the parameters could be easily entered by a user. As such, it would also be helpful if the system allowed the user to easily pair different devices with the system to monitor and if the system could identify and manage each of the devices provided.

In addition, it would be beneficial if a system provided an intuitive graphical user interface for a user to implement one or more of the function described above. One or more of the embodiments disclosed below addresses the desirable features discussed above in addition to other desirable features.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some examples, a system that can be configured to monitor a task is disclosed. The system may be configured to receive information and parameters of a task, such as a payment rate, location of the task, duration of the task, bonuses associated with the task, and device identifiers for monitoring the task. In some examples, the system may conduct micropayments as a task and/or service are occurring. The payments may be made based on the total cost divided by the expected time it will take to finish the task and/or service. The units used for the expected time may be based on the rate in which payments are going to be made. For example, an hour task or service that is sixty dollars may be split over sixty minutes. In such an example, the system may conduct payments at one dollar per minute as a task and/or service is occurring.

In some example, a system may be configured to monitor the time of a service and remunerate payment as the service progresses. The payments may be in small increments, sometimes referred to as micropayments, based on short periods of time. For example, currently when someone watches a movie, a person pays for a ticket and if the person does not like the movie they will either get a full refund or be denied. This is a bit unfair to both parties. For example, if a person watched half a movie and is fully refunded, the entertainment provider is not compensated for the half of the movie that was watched. On the other hand if the person walks out of the movie and is not given a refund, the user is not refunded for the services not received. A better way would be to refund half the movie. As such, in some examples, the system monitors the time a service is being used and conduct micropayments as the service is conducted. The increments between payments may be very short, such as every second or minute. In this manner, if someone is watching some sort of video media, the person pays for as much as the video media is watched. For example, a person may be watching a movie in a theatre or at home from a computer. The system may monitor whether the person is watching the movie by determining that the person is within a room of the theatre or receiving indications that a media player is playing a movie on a computer. The system may conduct payments so long as those criteria occur. But, if the person walks out of the theatre room or pauses the movie, the payments may stop. The benefit of this is that a person can be refunded a fair amount for movies or other entertainment that the user dislikes and/or regrets purchasing. This system also saves time and money for a service provider because the service provider does not need to divert personnel time to providing refunds. In some examples the system may be expanded to other services such that micro payments occur over time, such as instead of paying wages every week, the wages could be paid every minute.

In some examples, the system may be configured to transfer payment to an account at a predetermined transfer rate and change the transfer rate in response to the occurrence of one or more parameters. The system may determine the occurrence of the one or more parameters from communicating with one or more identified devices. For example, a payment rate may change when the system receives information from a device the device has left a certain area. In some examples, the payment rate may change when a device is within a certain distance of another device or when a device is in use. In some example the system may change the payment rate based on whether a device is in use, such as a telephone, television, and/or the like. In some examples, the system may determine which room a person is in based on the device on the person and adjust a payment rate accordingly. For example, a plumber who is working on a broken shower may have their payment rate reduced when the system determines that the plumber has left the bathroom.

The system may also be capable of conducing payments at relatively small increments of time. For example, a task may have a payment rate of one dollar per minute, and the system may transfer funds from one account to another account at the rate of one dollar per minute. The system may also provide a graphical user interface that allows a user to change the payment rate on the fly. The graphical user interface may allow the user to change the unit of time associated with the payment rate and/or the amount of the payment rate. The system may include one or more of the above functionalities and/or or other capabilities, which are discussed in more detail below.

Figure 1:
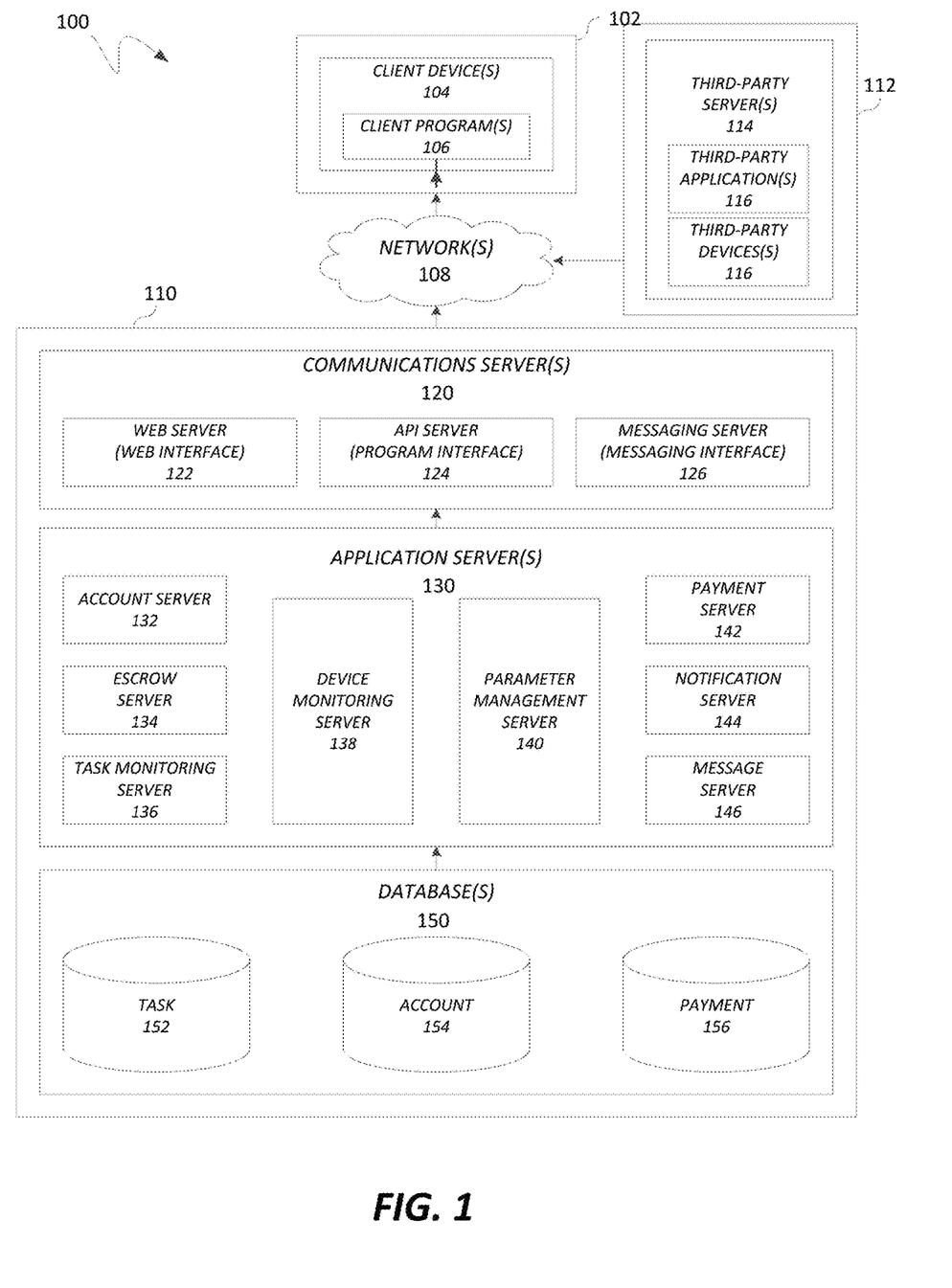
FIG. 1 is a block diagram of an exemplary computing system that is adapted for implementing a system for task monitoring.

FIG. 1 illustrates, in block diagram format, an exemplary embodiment of a computing system adapted for task monitoring. As shown, a computing system 100 may comprise or implement a plurality of servers and/or software components that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging, interne relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, as well as other suitable networks. For example, client devices 104 may communicate with network-based system 110 over the Internet or other suitable WAN by sending and or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

In various embodiments, computing system 100 may include, among other elements, a third party 112, which may comprise or employ third-party servers 114 hosting a third-party applications 116 and third-party devices 118. In various implementations, third-party servers 114 and/or third-party applications 116 may host applications associated with or employed by a third party 112. For example, third-party servers 114 and/or third-party applications 116 may enable network-based system 110 to provide client 102 with additional services and/or information, such as data logging, data communications, security functions, and/or other services, some of which will be discussed in greater detail below. Third-party servers 114 and/or third-party applications 116 may also provide system 110 and/or client 102 with other information and/or services, such as email services and/or information, social networking services and/or information, property transfer and/or handling, purchase services and/or information, and/or other online services and/or information. Third-party servers 114 and/or third-party applications 116 may work with third-party devices 118 to provide some of the third-party services. For example, third-party devices may be may be wireless communication devices such as Bluetooth® beacons, wireless switches and/or routers, RF transmitters, IR transmitters, and/or the like. In some examples third-party devices 118 may be used to locate and/or determine the location of a user 102 by locating one or more of client devices 104. For example, third-party devices 118 may be wireless beacons using Bluetooth® Low Energy that can connect, communicate, and triangulate the location of one or more user devices 102 when within communication proximity. In some embodiments, third-party devices 118 may include locator tags and wireless beacons for locating the locator tags.

In one embodiment, third-party servers 114 may include a social networking server that hosts a user's social network account. In another embodiment, third party-servers 114 may include an email server that hosts a user's email account. In yet another embodiment, third-party severs 114 may include one or more servers for aggregating user data and statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services, account authentication, social networking, account management, parameter management, parameter monitoring, parameter execution, monetary transfers, device management, device monitoring, and other services to users that access network-based system 110. In various embodiments, client 102 may communicate with applications servers 130 of network-based system 110 using one or more client devices 104 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, third-party servers 114, third-party applications 116, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 and/or third party 112 to the various services and functions provided by application servers 130.

Application servers 130 of network-based system 110 may be a server that provides various task monitoring and management services. Application server 130 of network-based system 110 may provide services such as, account services, authentication services, task management services, payment services, user data gathering services, return services, escrow services, location services, notification services, fund transfer, funds and/or currency exchanges, and/or other services. Application servers 130 may include an account server 132, a device monitoring server 138, a task parameter management server 140, a payment server 142, a notification server 144, and/or a message server 146. Application servers 130 may further include an escrow server 134, a task monitoring server 136, a payment server 142, and/or a messaging server 146. These servers, which may be in addition to other servers, may be structured and arranged to monitor tasks and conduct payments based on the tasks as they are completed in addition to some or all of the other services as discussed above and in more detail below.

Application servers 130, in turn, may be coupled to and capable of accessing one or more databases 150 including a task database 152, a user account database 154, and/or user payment database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
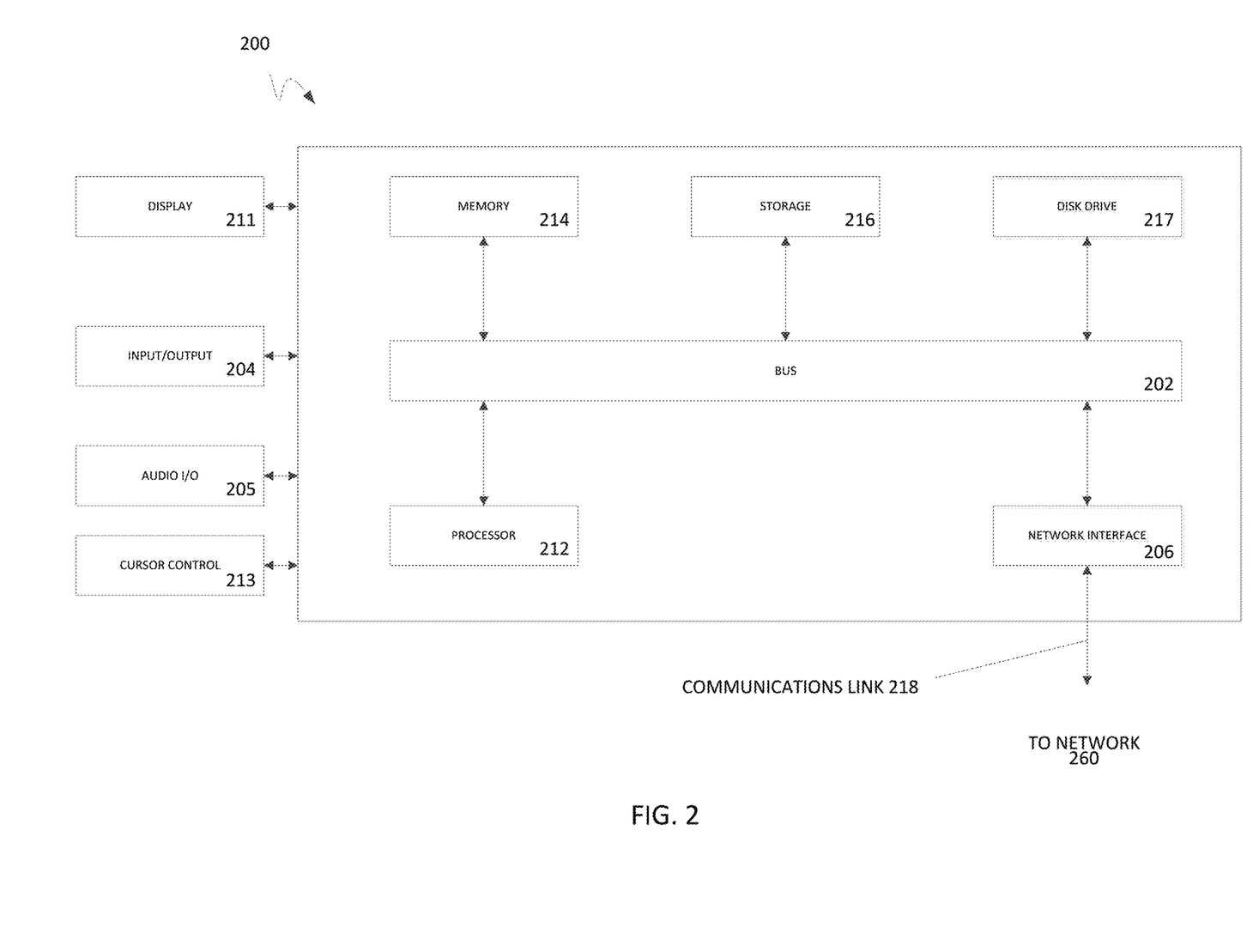
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, Bluetooth device, key FOB, badge, etc.) that is capable of communicating with a network. A service provider and/or a payment provider may utilize a network computing device (e.g., a network server) capable of communicating with the network. It should be appreciated that each of the devices utilized by users, service providers, and payment providers may be implemented as computer system 200 in a manner as follows.

Additionally, as more and more devices become communication capable, such as sensors using wireless communication to report, track, message, relay information and so forth, these devices may be part of computer system 200. For example, a user may have clothing with sensors that can provide location information, motion information, and/or other information regarding the user. This information may be transmitted through a network connection to the system described herein and/or relayed through a user device.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touch screen, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a social networking server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
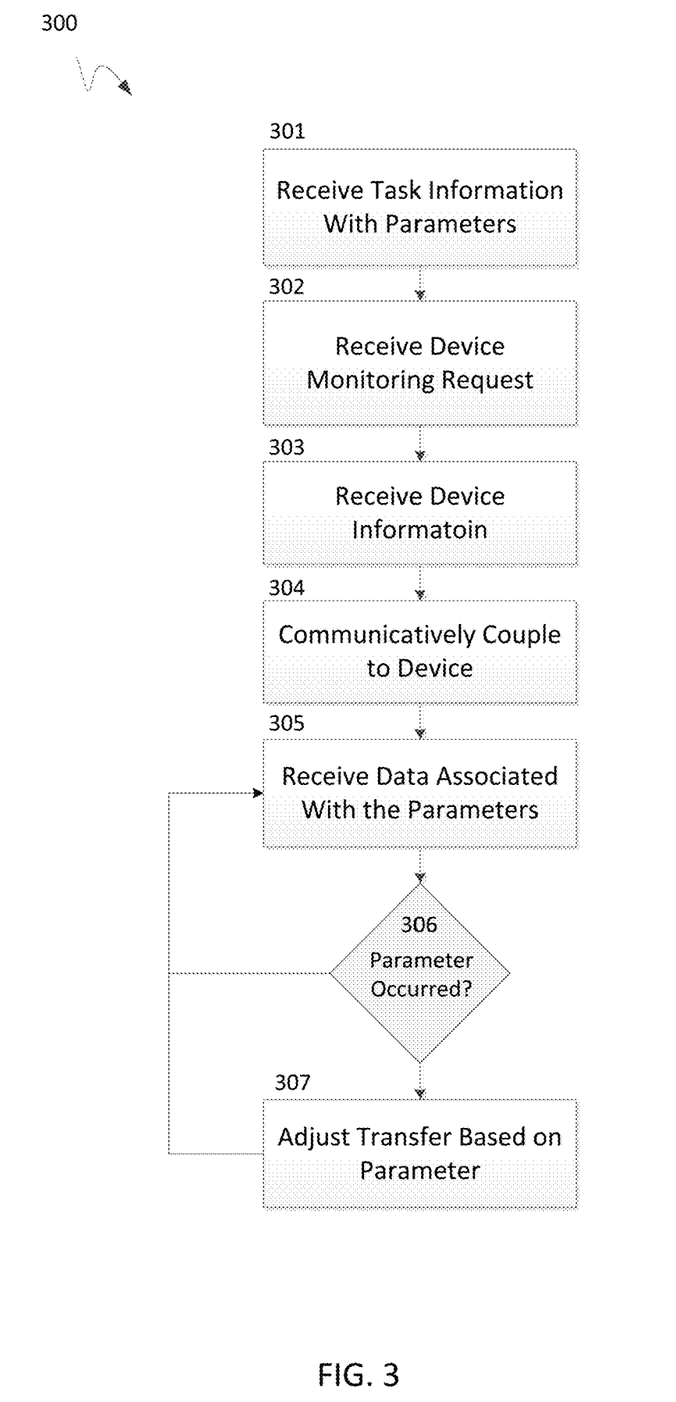
FIG. 3 is a flow diagram illustrating exemplary processes of a task monitoring system.

FIG. 3 illustrates exemplary processes 300 that may be implemented by a system for task monitoring with automated transfer adjustments. Processes 300 may be implemented on a system such as system 100 of FIG. 1 according to some embodiments. According to some embodiments, processes 300 may include one or more of processes 301-307 which may be implemented, at least in part, in the form of executable code stored on a non-transitory, tangible, machine readable media that, when run on one or more processors, may cause a system to perform one or more of the processes 301-307.

At process 301, the system may receive task information with parameters. In some examples, the system may provide a graphical user interface for a user to insert or otherwise enter/input the task information and/or parameters. In some examples, the GUI may be provided through an application and/or a web application. In some examples, the system may cause a user device to display the GUI when the user device communicates with the system over a network using a web address in a web browser.

In some examples, the GUI may include one or more data entry fields, drop down menus, check boxes, and/or the like for entering in task information and/or parameters. In some examples, the user may enter in task information and/or parameters that may delineate a service and/or a job. Task information may include, but is not limited to, a payment rate, a payment based on percent completion of a task, a payment cap, payment minimum, maximum completion time, bonuses payments, and/or the like. In some examples, the parameters may be triggers that change or switch values associated with the task information. For example, a parameter may be that the payment rate depends on the location of one or more user devices. There may be a first payment rate while the one or more devices are within a first geo-fence and a second payment rate while the one or more devices are within a second geo-fence and/or outside of the first and/or second geo-fence. In some examples, the one of the payment rates may be zero. In some examples, one of the payment rates may be a fraction of the other payment rate. In some examples, one of the payment rates may be negative. In some examples the payment rate may be an increase, such as a percentage increase of one of the other payment rates.

In some examples, the parameter may be to complete a task within a predetermined amount of time and changing the payment rate in response to the task not being completed within the predetermined amount of time. In some examples, the parameter may be based on a certain time of day, such as a different payment rate at night than during the day.

In some examples, a parameter may be to unlock a bonus when evidence of a completed task is provided and/or confirmed. Evidence of a completed task may be provided by a digital image and/or digital video, which may be confirmed by sending the image and/or video of the completed task to the system and the system confirming the completion of the task by sending the image and/or video to an authorized user for confirmation. In some examples, a bonus confirmation may be through other indicators of completion from one or more devices, such as location information, activity information, time information, text messaging from a third party, other information provided by devices, and/or the like.

In some examples, the parameter may comprise having some or all of a payment to be placed into escrow. For example, when a first parameter causes the system to reduce the payment rate, the system may put the difference from the original payment rate and the reduced payment rate into escrow. The amount held in the escrow may be maintained for a predetermined amount of time that may be disputed. A successful dispute may cause some or all of the funds held in escrow to be transferred to the disputing party. In some examples, if there is no successful dispute by the predetermine amount of time, the funds may be returned to the originating account.

In some examples, there may be a parameter to have a first payment rate based on signals from one or more devices, which may be signals that a service provider is progressing on a task, and a second payment rate when the signal is not received or a difference signal is received, such as signals that indicate that the service provider is not progressing on a task. Some device signals may be motion sensor data, pressure sensor data, keystroke data, location data, heat sensor data, image data, and/or the like, which may be received from devices at or near a specific location of the task, such as a television, washing machine, thermostat, monitor, refrigerator, oven, stove, landline telephone, and any suitable device capable of receiving and sending data, such as any device within a "connected" home or other location, also sometimes referred to as the "Internet of Things.".

At process 302, the system may receive a request to monitor one or more devices for the occurrence of one or more parameters and tasks established at process 301. In some examples, the request may come from a user selecting an actuatable element and/or button displayed on a GUI provided by the system for one of the parameters and/or tasks. In response, the system may request information about the device for monitoring. For example, the system may request a device identifier and/or user name associated with the device. In some examples, the system may provide software for the device to install. In some examples, the system may request that the device register with the system.

At process 303, the system may receive the device information requested at process 302. In some examples, the user may provide an identifier, such as a phone number associated with the device for the system to connect with. The system may send a message such as a short message service (SMS) message with a link for the device to communicate and/or pair with the system. In some examples, the system may provide a link to the user to share with one or more devices to register with the system, and when the devices communicate with the system through the provided link, the devices may provide information about the device(s) to the system. In some examples, monitored devices may communicate through one or more other user devices. For example, a user device may pair with one of the devices through a short range wireless communication protocol, such as Bluetooth, and relay device information from that device.

At process 304, the system may communicatively couple with the device based on the device information received at process 303. In some examples, the system may communicatively couple with the device over a network such as the Internet. In some examples, the system may couple with the device to receive certain information from the device, such as whether another device is communicatively coupled with the device, the GPS location of the device, whether the device is moving (e.g. accelerometer readings, gyroscope readings, etc.), whether the device is in use (e.g. indications of sleep mode, screen off, device power usage, etc.), how the device is being used (e.g. on a call, texting, browsing the internet, application usage, etc.), and/or the like.

In some examples, the system may poll, ping, and/or request the device for the information. The poll, ping, and/or requests may occur at regular periodic intervals. In some examples the device may stream the information to the system and/or periodically provide updates.

At process 305, the system may receive from the devices being monitored, data associated with the parameters, such as the information described at process 304. In some examples, the system may determine the occurrence of one or more parameters based on the data received. In some examples, the occurrence of one or more parameters may be based on information received from multiple devices. For examples, signal strength and/or distance data of a user device from several reference devices may be used to triangulate the location of a user device. In some examples, location data from several reference devices may be used in conjunction with motion data from a user device to determine that the device is on the person and/or in use while within a certain geofence.

At process 306, the system may determine whether one or more parameter received at process 301 occurred. In some examples, the system may analyze the data received from the one or more devices at process 305 to determine whether one or more of the parameters at process 301 occurred. The manner in which the system analyzes the data may depend on the device that provided the information, the type of data received, and/or the parameter.

For example, a first parameter may be that a user or employee stay within a geofence by staying within a certain distance of one or more reference devices, such as a baby monitor, a Bluetooth dongle and/or pin, wearable devices (e.g., fitness bands, fitness monitoring devices, smart watches, smart shoes, and/or any other smart wearable objects), wireless beacon, smart appliances (e.g. smart HVAC devices, smart coffee makers, automated chefs, smart Sous Vide devices), and/or any other smart/network capable devices. In some examples, the data received may be from a device of the employee and/or one or more reference devices.

In some implementations, the system may receive one or more codes from the device of the employee, the one or more codes being associated with the one or more reference devices and obtainable when within a geofence. The code may be codes that the system provides to the one or more reference devices, which the device of the employee can obtain while within the geofence. In some examples, the codes may be generated and regularly updated and/or changed based on a key or seed. The system may also maintain a copy of the key and/or seed such that the code can also be generated by the system. The key and/or seed may be used to generate a code based on a time element.

In such an example, the system may compare the codes received from the employee device with codes held in a database and/or generated based on device associated with the codes. In some examples, the user device may identify the device associated with the code. In some examples, the code may indicate which device the code is associated with. In some examples the device may also provide a time stamp associated with the code. Based on the received code, the system may determine whether the employee device, and/or therefore the employee, is within the geofence or not. For example, when a correct code is received, the system may determine that the device is within the geofence. In contrast, if the correct code is not received, the system may determine that the device is not within the geofence.

In some examples, the system may recognize the occurrence of a parameter when the system determines that the employee/employee device, which was previously determined to have been within a geofence, has left or entered into another geofence. For example, the system may determine that the employee/employee device has left a geofence if the system marked the device to be in within the geofence but receives an incorrect code, receives code that is not up to date, receives a code that does not have a time stamp for a current time, does not receive a code, and/or the like. In such an example, the system may update the employee/employee device state to being outside of the geofence and determine that a parameter has occurred.

Similarly, the system may determine that the employee/employee device has entered into a geofence when the device, which the system has recorded as outside of a geofence, provides correct codes for the geofence. In some examples, the system may request these codes from the employee device at regular intervals. In some examples, the employee device may automatically send and/or attempt to send codes to the system at regular intervals.

In some examples, the system and/or the device may log codes when a communication connection between the system and the device is lost or unavailable. The log may be provided with time stamps to the system when a connection is regained and the system may be able to treat the log as having happened in real time.

In some examples, the reference devices may send data to the system for the system to determine whether an employee device is within a geofence. For example, the geofence may be based on the communication range of the one or more reference devices. The reference devices may report to the system which devices are connected and/or communicating with the reference device. The system may check and determine whether one or more of the reference devices reported the employee device as being in communication with it. When one or more of the reference devices has reported the employee device as being in communication with the employee device, the system may determine that the user device is within the geofence. In contrast, if the one or more references devices do not report the employee device as being in communication with the reference device, the system may determine that the reference device is outside of the geofence. In some examples, the reference devices may attempt to ping the employee device to determine whether the employee device is in communication with the reference devices. In some examples, the reference devices may attempt to ping the employee device in response to a command from the system.

In some examples, the one or more reference devices may triangulate the location of the employee device to determine whether the employee device/employee is within a geofence. By using triangulation, the system may be able to more accurately determine where the employee device is located. In this manner, the system may be able to determine exactly which room the employee device, and presumably the employee, is in. In some examples, three or more reference devices may each determine the distance of the employee device to each respective reference device. In some examples, the reference devices may be able to determine the distance between each respective reference device by one or more of the receive signal strength, time of arrival, and/or time difference of arrival of wireless communication signals. In some examples, the reference devices may send the receive signal strength, time of arrival, and/or time difference of arrival of wireless communication signals with the employee device to the system for the system to calculate the distance between the employee device and the reference devices.

The system, having determined the distance between the employee device to 3 or more reference devices, the system can triangulate the location of the employee device with respect to the reference device. The system may have one or more geofences set up based on the reference devices, such that the system can determine whether the employee device is within the one or more geofences and whether one or more parameters have been reached.

Other methods of determining whether a person is within a geofence may include, motion sensors, cameras, and/or heat sensors. For example, to ensure that a baby sitter is within a particular room or with the baby, the system may receive sensor data from a motion sensor, camera, and/or heat sensor. The system may determine from the sensor data the number of persons in a room and/or whether someone has left the room, or whether someone is in another room, or whether someone is missing from several rooms. These determinations may trigger the occurrence of one or more parameters. In some examples, the GPS location from an employee device may be used to determine whether the device is within a geofence.

In some examples, the system may determine whether other types of parameters have been reach, which may not be based on data received from the one or more device. For example, the system may determine when a payment cap is reached or when a certain time has passed. The system may be able to determine this information independent of the user and/or employee devices. For example, the system may transfer payment at the payment rate to an account of an employee and maintain a log of the total payment amount. The system, in response to determining that the total payment has reached a payment cap, may change the payment rate to zero or another rate.

In some examples, the system may log and/or monitor the amount of time an employee or worker has spent on a job. The system in response to the amount of time reaching and/or passing a threshold may change the payment rate. In some examples, the payment rate may be negative, such that money that has been paid to the employee is paid back or put into an escrow at a certain rate. For example, when an employee has guaranteed work to be finished under a certain amount of time, the payment rate may become negative after that certain amount of time has passed. In some examples, the threshold time may represent when overtime occurs, and the system in response to the time passing this threshold time may increase the payment rate to match overtime pay or some other additional pay.

In some examples, the system may determine that a parameter occurred by receiving confirmation from the user that the parameter occurred. For example, an employee may indicate that one of the parameters has occurred and provide the system with proof, such as an image or video. In some examples, the proof may be a live video stream. The system may relay the evidence to another device, such as the device of an employer, and a request to confirm the occurrence of the parameter. They system may determine that a parameter has occurred when the system receives confirmation of the parameter from the device of the employer.

In some examples, some of the parameters may be for a device to leave a geofence, leave a geofence for a certain amount of time, move a certain distance, returning to the geofence and/or move to a certain destination. For example, the system may be used to monitor a dog walker, baby sitter, package delivery, and/or the like. In some examples, the parameter may be that a device, such as a dog collar, leaves an area, such as a location of a residence. There may be additional related parameters such as leaving the location for a threshold amount of time, moving a certain distance, and/or returning to the location. Other examples may include taking a dog from one location, such as a residence, to a second location, such as a dog park or doggie daycare.

The system may determine the occurrence of one or more of these parameters based on information received from the reference device and/or device of the employee. For example, the device, such as a dog collar, may provide the system GPS location information indicating whether the dog collar is within a threshold distance of an address and where the device traveled. In this manner, the system may determine whether the device traveled a certain distance, left a geofence, returned to the geofence, and how long the device was outside of the geofence. In some examples, the system may also receive GPS information from the employee device and determine whether the GPS location of the employee device stays within a threshold distance of the reference device. In this manner, the system may be able to determine that the employee is the one performing the task. As such, the system may use a combination of data received to determine whether a parameter has occurred.

In some examples, one or more parameters may be triggered by the use of one or more reference devices. For example, one or more parameters may be based on the detection of one or more reference device is in use, such as a telephone, television, videogame, and/or the like. In some examples, there may be a parameter to reduce pay when one or more of these reference devices are in use, such as for a babysitter who is supposed to be watching over kids. Similarly, there may be a parameter to increase a payment rate when a device is in use, such as a microwave, oven, and/or other food preparation devices. These reference devices may be configured to communicate with the system and provide indicators of when the device is turned on and/or in use. In response to receiving these indicators, the system may determine whether one or more parameters have occurred.

In response to the system determining that a parameter has occurred, the system may continue to process 307. Otherwise, the system may continue to receive and monitor data at process 305.

At process 307, the system may adjust a transfer based on the parameter that occurred at process 306. In some examples, the system may have a transfer rate set at a first rate which may be an amount per unit of time and the system may reduce or increase the transfer rate to a second transfer rate. For example, a first transfer rate may be one dollar per minute, and the system may change the transfer rate to fifty center per minute or two dollars per minute depending on the task information and parameters received at process 301 and the determination that one or more parameters occurred at process 306. In some examples, the rate may go to zero in response to one or more parameters, such as when a payment cap is reached. In some examples, the unit of time may be increased or decreased to affect the transfer rate. For example, the transfer rate may switch from one dollar a minute to one dollar every two minutes.

In some examples, the system may be at an uninitiated state and switch to an initiated state. In the uninitiated state, the system may have a transfer rate of zero. At process 306, the system may determine that parameter for initiating a transfer rate occurred, such as a user device entering a geofence at a certain time and/or an initiation command received from a device of the employer.

In some examples, the system may cause the transfer of funds from one account to another account at the rate of transfer set at 307. In some examples, the transfers may be conducted in real time. For example, if the transfer rate were to be one dollar per minute, the system may cause a monetary transfer from a first payment account to a second payment account one dollar for every minute of time that passed. This is different and in contrast to lump sum payments that usually occur for money earned at a faster rate. For example, someone being hired at the rate of ten dollars an hour may get paid a lump sum of four hundred dollars at the end of a work week when the person worked forty hours. In such an example, the money owed is accrued over time and then paid later on, which is different than paying in real time as the money is earned.

In contrast, the system may conduct many micro transactions to transfer funds to a user at the rate of their payment rate, or even faster than their normal payment rate. In some examples, the system may transfer money into a user account at the payment rate, but instead of transferring money to the user account from an employer account, the system may transfer the money from the payment institution and increase a debt by the employer at the payment rate. The debt may then be paid at a later time by the employer. In this manner, the debt of the employer is to a payment provider instead of an employee, and the employee is paid in a timelier manner. As a result of transferring funds as money is earned, the recipient may be able to receive the interest of the earned money immediately rather than the employer receiving that benefit. Furthermore, the risk of money loss is transferred from the employer to the employee.

In some examples, when a payment rate is reduced below a threshold or base amount in response to the occurrence of a parameter, the system may transfer the difference between the reduced rate and the threshold amount into an escrow account. The system may also determine and log how much of the total escrow value is associated with each parameter occurrence. In this manner, the parameter, the reduced payment rate, and the amount in the escrow may be disputed. For example, a babysitter may have had their payment rate reduced when the system determined that the telephone was used, but the babysitter may dispute that the call was part of their duty, such as an emergency call to the parents, doctor, police, and/or the like. In some examples, they system may display each occurrence of a parameter on a device of the employee, such as a smart phone. The display may provide a GUI that allows the user to dispute the occurrence of a parameter and provide comments. The comments and the dispute may be provided to a device of the employer, which the employer may be able to reject or confirm. In response to receiving a confirmation of the dispute from the employer device and/or account, the system may transfer the value reduced by the parameter from the escrow account to the account of the employee.

Figure 4:
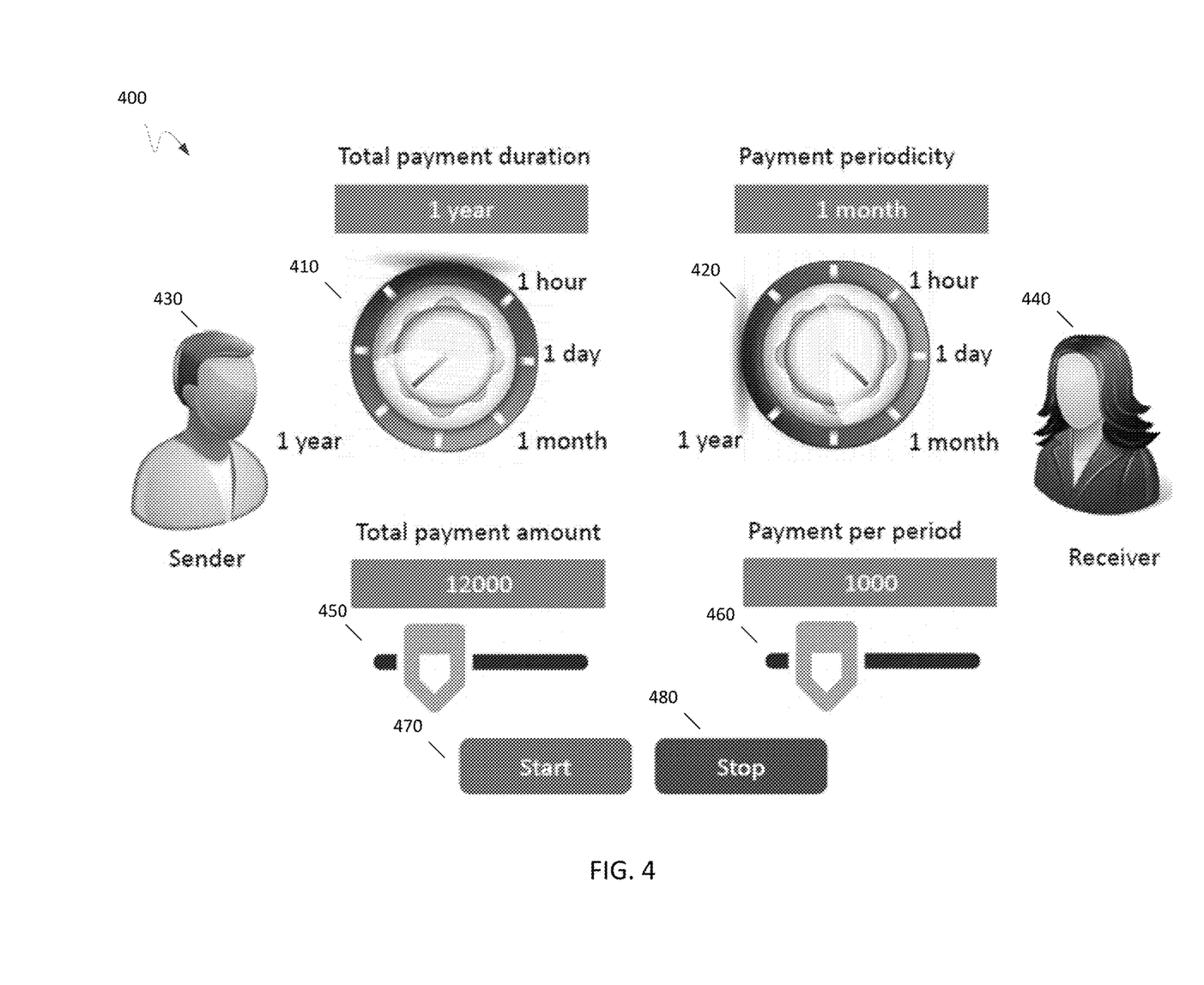
FIG. 4 is an exemplary graphical user interface for controlling parameters of a task.

FIG. 4 illustrates an exemplary GUI 400 that may be provided by the system to a user device to edit and/or change payment rates. In some examples, the GUI may be provided to a user to provide information and/or parameters to the system in process 301 of FIG. 3. In some examples, GUI 400 may have one or more dials, such as dial 410 and dial 420.

In some examples, GUI 400 may have images and/or icons, such as icon 430 and icon 440 representing the sender and recipient of payment respectively. In some examples, icon 430 and icon 440 may be personalized be each individual represented by icons 430 and 440. In some examples, the individuals represented by icon 430 and 440 may upload an image to display as icons 430 and 440.

Dial 410 may be a GUI dial that can be turned by a user through an input device, such as a touch screen, mouse, and/or another peripheral. Dial 410 may control a duration that a payment based on a payment rate can continue for and/or the expiration of a contract. As shown in this example, the duration is to 1 year. As shown, the dial may be turned to increase or decrease the duration.

Dial 420 may be a GUI dial that also may be turned by a user through an input device, such as a touch screen, mouse, and/or another peripheral. Dial 420 may control the unit of time for a payment rate and/or the payment periodicity. As shown, the payment periodicity in FIG. 3 is set to one month, but is capable of having longer or shorter periodicity. In some examples, the periodicity may be much shorter, such as one second, one minute, and/or the like.

In some examples, GUI 400 may include a slider bar 450 that may change a payment cap when the user slides the slider bar. GUI 400 may also have a slider bar 460 for adjusting the amount of payment of a payment rate and/or payment period.

In some examples, GUI 400 may include a start button 470 and a stop button 480. Start and stop buttons 470 and 480 may control whether to start, stop, and/or pause a transfer of funds from the sender to the receiver.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   obtaining location data of a first device through a communication session with the first device to, wherein the first device is associated with a payment account;
   determining, by one or more hardware processors based on the location data obtained from the first device, that the first device is located within a predetermined geographical area;
   in response to the determining and while the first device is located within the predetermined geographical area, executing a plurality of transfers, by the one or more hardware processors, of a first payment amount to the payment account according to a first payment frequency, wherein the first payment amount is a non-zero amount, and wherein the plurality of transfers of the first payment amount are first segments of a total cost;
   initiating, by the one or more hardware processors, a communication between the first device and a second device in the predetermined geographical area to determine a distance between the first device and the second device;
   determining, by the one or more hardware processors, the distance between the first device and the second device is within a predetermined range;
   in response to the determining that the distance is within the predetermined range, changing, by the one or more hardware processors, the first payment amount and the first payment frequency to a second payment amount and a second payment frequency, respectively, wherein the second payment amount is a non-zero amount;
   executing a plurality of transfers, by the one or more hardware processors, of the second payment amount to the payment account according to the second payment frequency, wherein the plurality of transfers of the second payment amount are second segments of the total cost;
   determining, based on the communication between the first device and the second device, that the distance between the first device and the second is no longer within the predetermined range;

in response to the determining that the distance between the first device and the second device is no longer within the predetermined range, stopping the plurality of transfers of the second payment amount to the payment account according to the second payment frequency; and re-executing the plurality of transfers of the first payment amount to the payment account according to the first payment frequency.

2. The method of claim 1, further comprising:

changing the second payment amount to a third payment amount and changing the second payment frequency to a third payment frequency in response to determining that the first device and the second device are located outside of the predetermined geographical area; and executing a plurality of transfers of the third payment amount to the payment account according to the third payment frequency.

3. The method of claim 1, wherein the predetermined range is determined based on a range of a short range wireless communication protocol.

4. The method of claim 1, wherein the second payment amount is higher than the first payment amount.

5. The method of claim 1, wherein the second payment amount is lower than the first payment amount.

6. The method of claim 1, wherein each of the plurality of transfers of the first payment amount is associated with an increment of time during a period of time that the first device is located within the predetermined geographical area.

7. The method of claim 1, wherein the first device is a mobile computing device of a first user, wherein the second device is a device attached to a second user, and wherein the changing the first payment amount to provide the second payment amount comprises increasing the first payment amount to the second payment amount higher than the first payment amount.

8. The method of claim 1, further comprising:

determining, based on the location data obtained from the first device, that the first device is outside of the predetermined geographical area; and in response to the determining that the first device is outside of the predetermined geographical area, aborting the executing the plurality of transfers of the first payment amount to the payment account.

9. The method of claim 1, wherein the operations further comprise stopping the re-executed plurality of transfers of the first payment amount to the payment account after a predefined time period.

10. A system comprising:

a non-transitory memory; and one or more hardware processors coupled with the non-transitory memory and configured to read instructions from the non-transitory memory to cause the system to perform operations comprising:

obtaining location data of a first device through a communication session with the first device, wherein the first device is associated with a payment account;

determining, based on the location data obtained from the first device, that the first device is located within a predetermined geographical area;

while the first device is located within the predetermined geographical area, performing a plurality of transfers of a first payment amount to the payment account according to a first payment frequency, wherein the first payment amount is a non-zero amount, and wherein the plurality of transfers of the first payment amount are first segments of a total cost;

initiating a communication between the first device and a second device in the predetermined geographical area to determine a distance between the first device and the second device;

changing, based on the distance, the first payment amount and the first payment frequency to a second payment amount and a second payment frequency, respectively, wherein the second payment amount is a non-zero amount;

performing a plurality of transfers of the second payment amount to the payment account according to the second payment frequency, wherein the plurality of transfers of the second payment amount are second segments of the total cost;

determining, based on the communication between the first device and the second device, that the distance between the first device and the second device is not within a predetermined range; and in response to determining that the distance between the first device and the second device is not within the predetermined range, reverting the second payment amount and the second payment frequency back to the first payment amount and the first payment frequency, respectively.

11. The system of claim 10, wherein the predetermined geographical area corresponds to a geofence.

12. The system of claim 10, wherein the first payment frequency corresponds to a number of increments of time that the first device is located within the predetermined geographical area.

13. The system of claim 10, wherein the second payment amount is higher than the first payment amount.

14. The system of claim 10, wherein each of the plurality of transfers of the first payment amount corresponds to an increment of a duration of time that the first device is located within the predetermined geographical area.

15. The system of claim 10, wherein the first device is a mobile computing device of a first user, wherein the second device is an entertainment system, and wherein the changing the first payment amount to provide the second payment amount comprises reducing the first payment amount to the second payment amount lower than the first payment amount based on a determination, from the communication between the first device and the second device, that the first user is using the entertainment system.

16. The system of claim 10, wherein the operations further comprise:

determining, based on the location data obtained from the first device, that the first device is outside of the predetermined geographical area; and in response to the determining that the first device is outside of the predetermined geographical area, aborting the performing the plurality of transfers of the first payment amount to the payment account.

17. The system of claim 10, wherein the operations further comprise stopping the re-executed plurality of transfers of the first payment amount to the payment account after a predefined time period.

18. A non-transitory machine-readable medium having stored thereon machine-readable instructions executable to cause a machine to perform operations comprising:

obtaining location data of a first device through a communication session with the first device, wherein the first device is associated with a payment account;

determining, based on the location data obtained from the first device, that the first device is located within a predetermined geographical area;

while the first device is located within the predetermined geographical area, executing a plurality of transfers of a first payment amount to the payment account according to a first payment frequency, wherein the first payment amount is a non-zero amount, and wherein the plurality of transfers of the first payment amount are first segments of a total cost;

initiating a communication between the first device and a second device in the predetermined geographical area to determine a distance between the first device and the second device;

determining the distance between the first device and the second device is within a predetermined range;

changing, based on the distance, the first payment amount and the first payment frequency to a second payment amount and a second payment frequency, respectively, wherein the second payment amount is a non-zero amount;

executing a plurality of transfers of the second payment amount to the payment account according to the second payment frequency, wherein the plurality of transfers of the second payment amount are second segments of the total cost;

determining, based on the communication between the first device and the second device, that the distance between the first device and the second device is no longer within the predetermined range; and in response to the determining that the distance between the first device and the second device is no longer within the predetermined range, reverting the second payment amount and the second payment frequency back to the first payment amount and the first payment frequency, respectively.

19. The non-transitory machine-readable medium of claim 18, wherein each of the plurality of transfers of the first payment amount corresponds to an increment of a duration of time that the first device is located within the predetermined geographical area.

20. The non-transitory machine-readable medium of claim 18, wherein the predetermined range is determined based on a range of a short range wireless communication protocol.

* * * * *